(12) United States Patent
Marsili et al.

(10) Patent No.: US 8,093,752 B2
(45) Date of Patent: Jan. 10, 2012

(54) SYNCHRONIZATION OF PLURAL DC-DC VOLTAGE CONVERTERS

(75) Inventors: Stefano Marsili, Spittal/Drau (AT); Luca Bizjak, Villach (AT); Luca Gori, Nimis (IT)

(73) Assignee: Infineon Technologies AG, Neubiberg (DE)

( * ) Notice: Subject to any disclaimer, the term of this patent is extended or adjusted under 35 U.S.C. 154(b) by 545 days.

(21) Appl. No.: 12/253,708

(22) Filed: Oct. 17, 2008

(65) Prior Publication Data

US 2010/0096923 A1  Apr. 22, 2010

(51) Int. Cl.
*H02J 3/14* (2006.01)
*H02J 1/00* (2006.01)

(52) U.S. Cl. ............................................. 307/41; 307/82
(58) Field of Classification Search .................. 307/41, 307/82
See application file for complete search history.

(56) References Cited

U.S. PATENT DOCUMENTS

| 5,467,372 A | * | 11/1995 | Nishitani | 375/244 |
| 2008/0231115 A1 | * | 9/2008 | Cho et al. | 307/41 |
| 2009/0289502 A1 | * | 11/2009 | Batarseh et al. | 307/44 |

* cited by examiner

*Primary Examiner* — Rexford Barnie
*Assistant Examiner* — Dru Parries
(74) *Attorney, Agent, or Firm* — Lee & Hayes, PLLC

(57) ABSTRACT

The present disclosure relates to circuits and methods for improving the performance of plural DC-DC voltage converters.

22 Claims, 5 Drawing Sheets

US 8,093,752 B2

SYNCHRONIZATION OF PLURAL DC-DC VOLTAGE CONVERTERS

BACKGROUND

Portable electronic devices typically require one or more regulated voltages so as to operate properly. Non-limiting examples of such portable devices include cellular telephones, personal digital assistants (PDAs), global positioning system (GPS) receivers, and a host of others. Often, a single direct-current (DC) source such as a battery is provided as the only supply of electrical energy for the portable device. Circuits commonly referred to as voltage converters provide for the respective DC voltage requirements of the portable electronic device.

One common voltage converter technique is to draw electrical energy from the DC source by way of pulse width modulation (PWM), the stream of pulses then being filtered to provide a regulated voltage to a load. As the voltage and/or current requirements of the load vary, the duty cycle of the PWM stream is controllably adjusted. Plural voltage converters can operate independently such that numerous regulated DC voltages are derived from a single (i.e., common) energy supply.

However, known PWM techniques rely essentially on rapid on-off switching (or coupling) between the energy source (e.g., battery) and the load or loads to be served. This rapid switching is undesirable from both the standpoint of battery life-cycling, as well as the resulting harmonic signals that must be tolerated or otherwise dealt with by the electronic circuitry of the portable device. Therefore, improved systems and techniques for voltage conversion within portable devices are desirable.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
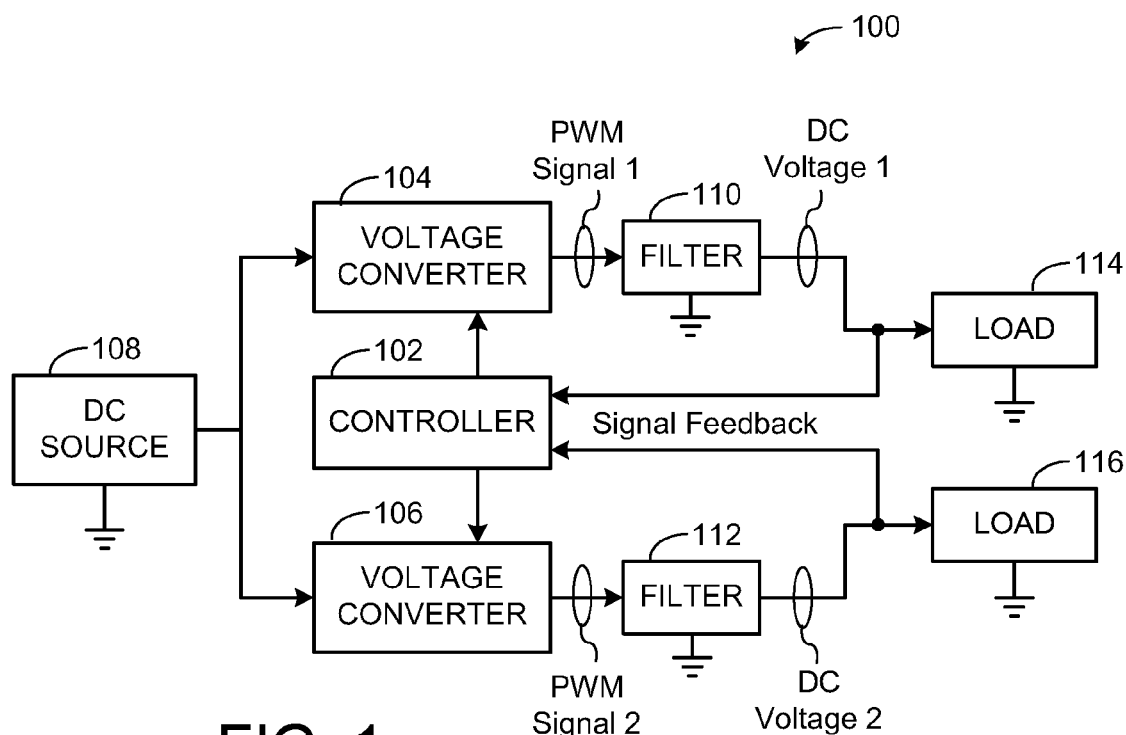
FIG. 1 is a block diagram depicting a voltage converter circuit according to the present teachings.

Disclosed herein are techniques and systems for DC-DC voltage conversion. Techniques in accordance with the present disclosure may advantageously improve operations of portable devices through reduced harmonic noise generation, as well as increased battery life-cycling. In general, such techniques are useful in a wide range of electronic applications, including cellular telephone service, wireless Internet access, audio and/or video communications, global positioning, and so on.

According to one implementation, an electronic circuit includes a controller configured to control at least a first voltage converter and a second voltage converter in accordance with a sequence of operating periods. The electronic circuit is also configured such that the first voltage converter provides a first output signal starting at the beginning of each operating period. The electronic circuit is further configured such that the second voltage converter provides a second output signal ending at the beginning of each operating period. Additionally or alternatively, the electronic circuit may be configured such that the second voltage converter provides a second output signal beginning at the ending of the first output signal.

According to another implementation, a method includes generating a first electrical signal pulse synchronized to start at the beginning of an operating period. The method also includes generating a second electrical signal pulse synchronized to end at the beginning of the operating period. Additionally or alternatively, the method may include beginning to generate the second output signal pulse as the first output signal pulse is ending.

According to still another implementation, an electronic circuit is configured to receive electrical energy from a direct current (DC) source. The electronic circuit is further configured to output a stream of signal pulses using the electrical energy. Each signal pulse is synchronized so as to either start or end at the beginning of each operating period in a sequence of operating periods. Additionally or alternatively, each signal pulse may be synchronized such that the end of each signal pulse respectively coincides with the start of another signal pulse.

In yet another implementation, an apparatus includes a source of electrical energy and an electronic circuit coupled to the source of electrical energy. The electronic circuit includes a controller configured to control at least two voltage converters according to a sequence of operating periods. The electronic circuit also includes a first voltage converter configured to receive electrical energy from the source, and to output a stream of electrical pulses. Each electrical pulse in the first stream of electrical pulses starts at the beginning of a respective one of the operating periods. The electronic circuit further includes a second voltage converter configured to receive electrical energy from the source and output a second stream of electrical pulses. Each electrical pulse in the second stream of electrical pulses ends at the beginning of a respective one of the operating periods. Additionally or alternatively, the apparatus may be configured such that each electrical pulse in the second stream of electrical pulses begins as each electrical pulse in the first stream of electrical pulses ends.

In still another implementation, a circuit includes a first circuit portion configured to output a stream of first pulse width modulated electrical pulses. The circuit also includes a second circuit portion configured to output a stream of second pulse width modulated electrical pulses. Each of the second pulse width modulated electrical pulses ends contemporaneous with the start of one of the first pulse width modulated electrical pulses.

Circuits and other functional aspects provided herein can be fabricated, at least in part, on a common substrate such that one or more respective integrated circuit devices are defined. In one or more implementations, at least a portion of the functional subject matter presented herein can be fabricated within a 130, 90, 65, 45, or 32 nanometer (or smaller) environment.

The techniques described herein may be implemented in a number of ways. Illustrative context is provided below with reference to the included figures and ongoing discussion.

First Illustrative Implementation

FIG. 1 is a block diagram depicting a voltage converter circuit (circuit) 100 in accordance with the present teachings. The circuit 100 includes a controller 102. The controller 102 is configured to control two voltage converters 104 and 106, respectively. In particular, the controller 102 is configured to synchronize operations of the voltage converters 104 and 106 according to an ongoing, repetitive cycle defined by a sequence of operating periods. The operating periods may be defined or derived from a clock source associated with the controller 102. Such a clock source may be integrated with the controller 102, or external of the controller 102.

The circuit 100 further includes a first voltage converter 104 and a second voltage converter 106 as introduced above. Each of the voltage converters 104 and 106 is coupled to receive electrical energy from a common (i.e., single) DC source 108. In one implementation, the DC source 108 is a battery. Other sources of electrical energy, or pluralities of batteries configured to operate as a whole, can also be used. In any case, each of the voltage converters 104 and 106 is configured to provide a pulse width modulated (PWM) output signal by selectively switching power from the DC source 108 under the control influence of the controller 102.

In one implementation, the voltage converters 104 and 106 respectively include a step-up or step-down resettable counter. In one implementation, such counters are defined by one-hundred thirty-two step resolution. Other implementations of the voltage converters 104 and/or 106 can also be used. Additionally, the voltage converters 104 and 106 can also be referred to as DC-DC voltage converters.

The circuit 100 also includes a first filter 110 and a second filter 112. In one implementation, each of the filters 110 and 112 is defined by single-stage inductor-capacitor (i.e., LC) filter of configuration well known in the electrical arts. Other filter configurations can also be used. The first filter 110 is configured to receive the PWM output signal from the first voltage converter 104 and to provide a smoothed DC voltage output to a first load 114. Similarly, the second filter 112 is configured to receive the PWM output signal from the second voltage converter 106 and to provide a smoothed DC voltage output to a second load 116. In turn, the controller 102 is coupled to the DC voltages in a feedback loop arrangement. In this way, two respective and possibly different regulated DC voltages are derived from a single DC source 108. Further operational details of the circuit 100 are described hereinafter with reference to FIGS. 2-4.

Although two voltage converters (i.e. 104 and 106) are referred to herein, it is to be appreciated that a greater number of voltage converters may be used to generate a greater number of signal pulses.

First Illustrative Operation

Figure 2:
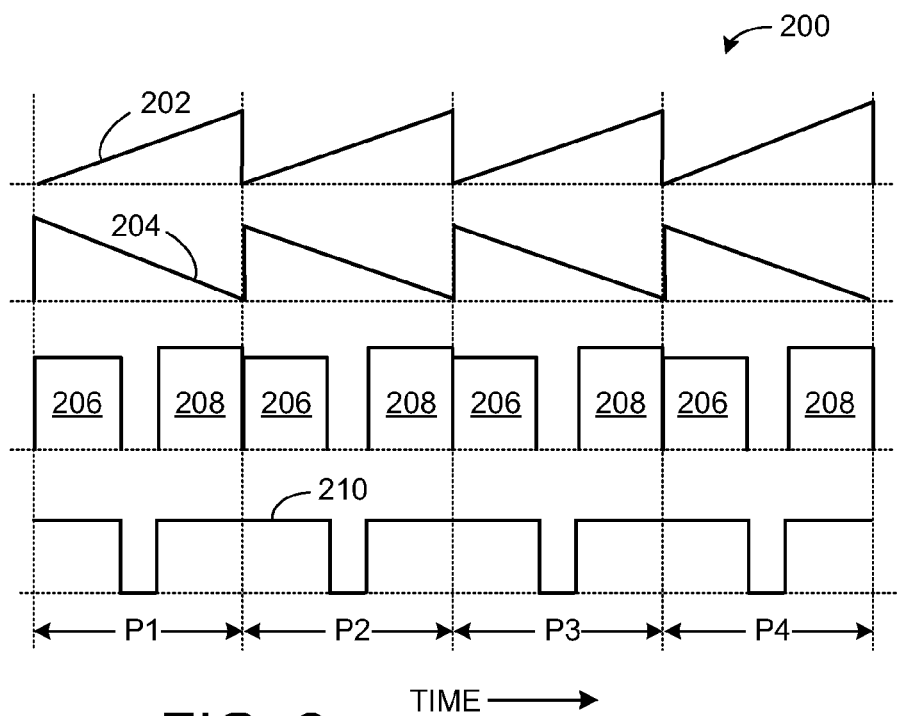
FIG. 2 is a signal timing diagram according to the present teachings.

FIG. 2 is a signal timing diagram 200 according to one illustrative and non-limiting operation according to the present teachings. The signal timing diagram 200 will be described with reference to circuit 100 in the interest of clarity. However, the present teachings contemplate other circuit and/or system implementations consistent with the teachings of FIG. 2.

The signal timing diagram 200 includes a first counter signal 202. The counter signal 202 represents an up-counter that increments from zero to a predetermined count and then resets during each of a sequence of operating periods P1 through P4. In turn, the signal timing diagram 200 includes a second counter signal 204 that represents a down-counter that decrements from a predetermined count to zero and then resets during each operating period P1-P4. In this way, the first and second counter signals 202 and 204 can be thought of as being (or operating) one-hundred eighty degrees out of phase with respect to each other, yet also being synchronized in regard to each operating period P1-P4. In one implementation, each operating period P1-P4 is defined by six-hundred twenty-five nanoseconds. In one implementation, the counter signals 202 and 204 correspond to operations of the first voltage converter 104 and the second voltage converter 106, respectively. While only four operating periods P1-P4 are depicted in the interest of simplicity, it is to be understood that any number of operating periods can be used. Thus, the present teachings anticipate normal operations of the circuit 100 (or another suitable implementation) that continue indefinitely.

The signal timing diagram 200 includes a first sequence of PWM pulses 206, and a second sequence of PWM pulses 208. Each PWM pulse 206 corresponds to a switched pulse of electrical energy provided by the first voltage converter 104. In turn, each PWM pulse 208 corresponds to a switched pulse of electrical energy provided by the second voltage converter 106. Additionally, each of the PWM pulses 206 and 208 is defined by a respective duty cycle. One of ordinary skill in the electrical engineering arts will appreciate that "duty cycle" is defined by the percentage of time that a waveform is energized or "ON" during an operating period. In reference to FIG. 2, P1, P2, P3 and P4 are respective operating periods of equal duration. As depicted in FIG. 2, each of the PWM pulses 206 and 208 is defined by a respective duty cycle of less than fifty percent. Furthermore, the sum of the respective duty cycles of the PWM pulses 206 and 208 is less than one-hundred percent.

The signal timing diagram 200 also shows that each PWM pulse 206 starts, or switches "ON", at the beginning of a respective period P1 through P4. Conversely, each PWM pulse 208 ends, or switches "OFF" at the end of a respective operating period P1-P4. It is further noted that any particular PWM pulse 208 ends essentially simultaneously with the start of the next PWM pulse 206, in an ongoing sequence. That is, each PWM pulse 208 switches "OFF" at the same time that another PWM pulse 206 switches "ON". The overall result is that the DC source 108 experiences little or no switching or transient current flow at the beginning of each operating period P1-P4. As a result, the power switching load as seen by the DC source 108 is represented by the loading waveform 210. As shown, the DC source 108 experiences just two current switching events within each operating period P1-P4. Because the number of switching events within the loading waveform 210 is reduced relative to known practices, battery life-cycling is increased, while transient signal generation is reduced and incident to a lower frequency spectrum.

Although only two sequences of signal pulses are described for the sake of simplicity and clarity, it is to be appreciated that a greater number of signal pulse sequences can be included in each operating period. Thus, for example, three or more pulses may be generated such that the sum of the respective duty cycles of these or more three pulses may be less than one-hundred percent. Any of the pulse width modulated electrical pulses may end contemporaneous with the start of another pulse width modulated electrical pulses, thus reducing transient signal generation.

Second Illustrative Operation

Figure 3A:
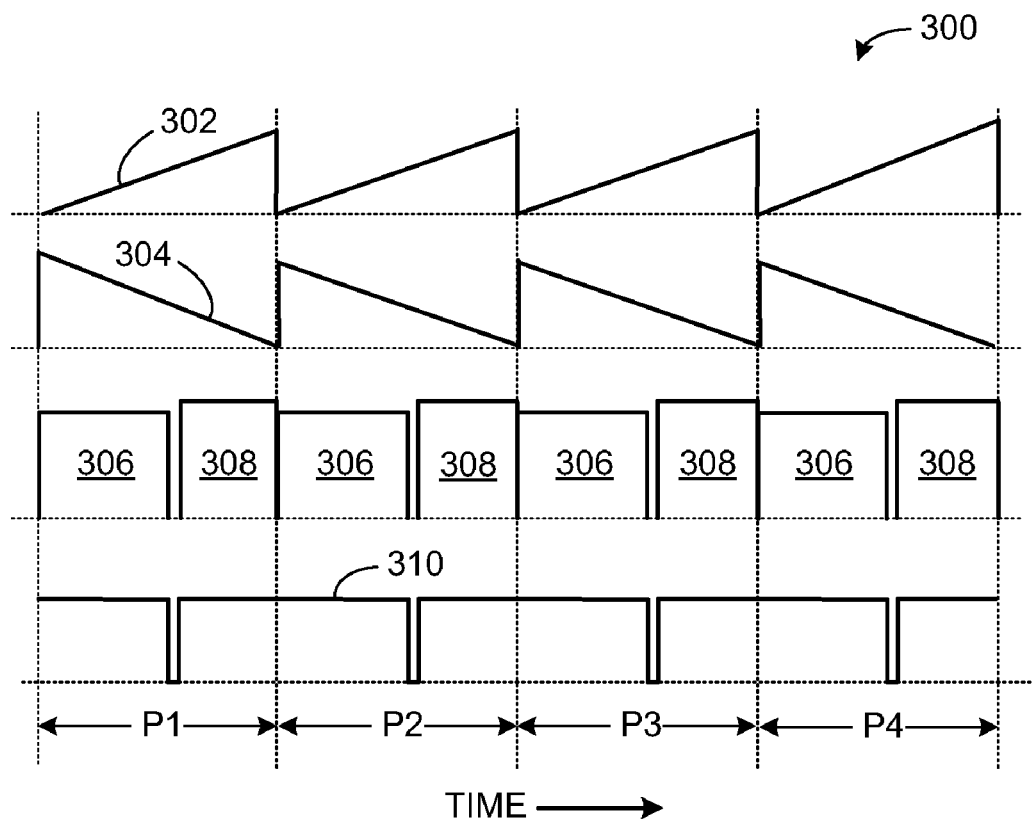
FIGS. 3a and 3b are variations of another signal timing diagram according to the present teachings.
Figure 3B:
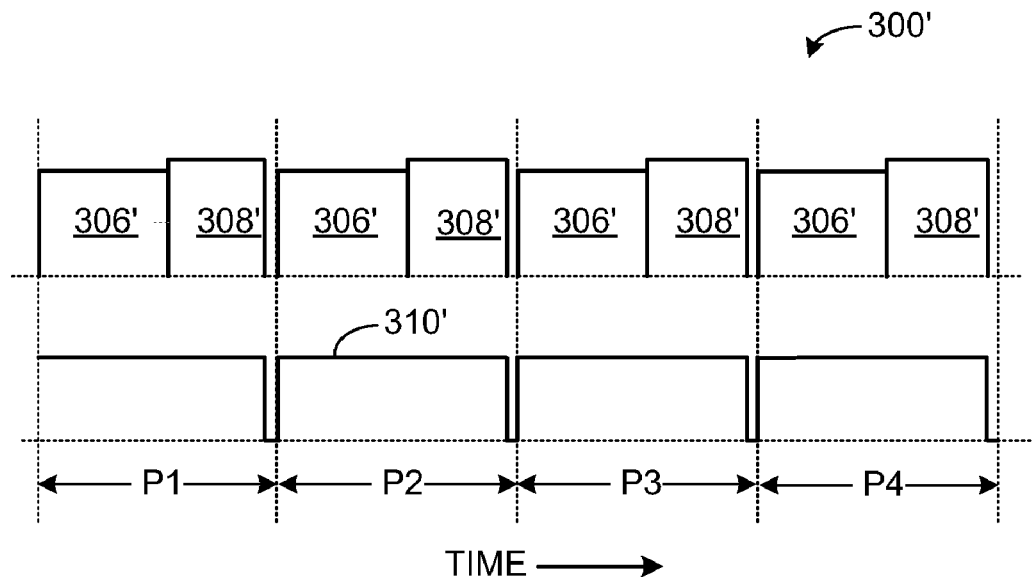

FIGS. 3a and 3b illustrate signal timing diagrams 300 and 300' according to another illustrative and non-limiting operation according to the present teachings. The signal timing diagrams 300 and 300' will be described with reference to circuit 100 in the interest of clarity. However, the present teachings contemplate other circuit and/or system implementations consistent with the teachings of FIGS. 3a and 3b.

The signal timing diagram 300 includes a first counter signal 302 and a second counter signal 304. The counter signals 302 and 304 correspond to up-counter and down-counter operations, respectively. In one implementation, the counter signal 302 corresponds to operations of the first voltage converter 104, while the counter signal 304 corresponds to the second voltage converter 106. Other suitable implementations can also be used.

The signal timing diagram 300 includes a first sequence of PWM pulses 306, and a second sequence of PWM pulses 308. Each PWM pulse 306 corresponds to a switched pulse of electrical energy provided by the first voltage converter 104. Each PWM pulse 308 corresponds to a switched pulse of electrical energy provided by the second voltage converter 106. Furthermore, each of the PWM pulses 306 and 308 is defined by a respective duty cycle. As depicted in FIG. 3a, each of the PWM pulses 306 is defined by a duty cycle in excess of fifty percent. In turn, each of the PWM pulses 308 is defined by a respective duty cycle of less than fifty percent. Moreover, the sum of the respective duty cycles of the PWM pulses 306 and 308 is less than one-hundred percent.

Each PWM pulse 306 starts, or switches "ON", at the beginning of a respective period P1 through P4. Conversely, each PWM pulse 308 ends, or switches "OFF", at the end of a respective operating period P1-P4. Any particular PWM pulse 308 ends simultaneously with the start of another PWM pulse 306, such that a stream of PWM pulses 306 and 308 are generated in an alternating and ongoing sequence. As in the case of FIG. 2 above, the result is that the DC source 108 experiences little or no switching or transient current flow at the beginning of each operating period P1-P4. The power switching load as seen by the DC source 108 is represented by the loading waveform 310. As shown, the DC source 108 experiences just two current switching events within each operating period P1-P4. While only four operating periods P1-P4 are depicted, any number of sequential operating periods can be used.

The signal timing diagram 300' is a variation of timing diagram 300. Timing diagram 300' includes a first sequence of PWM pulses 306', and a second sequence of PWM pulses 308'. Each PWM pulse 306' corresponds to a switched pulse of electrical energy provided by the first voltage converter 104. Each PWM pulse 308' corresponds to a switched pulse of electrical energy provided by the second voltage converter 106. Furthermore, each of the PWM pulses 306' and 308' is defined by a respective duty cycle. As depicted in FIG. 3b, each of the PWM pulses 306' is defined by a duty cycle in excess of fifty percent. In turn, each of the PWM pulses 308' is defined by a respective duty cycle of less than fifty percent. Moreover, the sum of the respective duty cycles of the PWM pulses 306' and 308' is less than one-hundred percent. The implementation shown in FIG. 3b is exemplary only. Thus, for example, the PWM pulses 306' and PWM pulses 308' may both have respective duty cycles of less than fifty percent.

Each PWM pulse 306' starts, or switches "ON", at the beginning of a respective period P1 through P4. Any particular PWM pulse 306' ends simultaneously with the start of another PWM pulse 308', such that a stream of PWM pulses 306' and 308' are generated in an alternating and ongoing sequence. As in the case of FIG. 2 above, the result is that the DC source 108 experiences little or no switching or transient current flow at the beginning of each operating period P1-P4. The power switching load as seen by the DC source 108 is represented by the loading waveform 310'. As shown, the DC source 108 experiences just two current switching events within each operating period P1-P4. While only four operating periods P1-P4 are depicted, any number of sequential operating periods can be used.

FIGS. 2 and 3a/3b depict respective illustrative and non-limiting operating situations in which the sum of the respective PWM pulse 306 and 308 duty cycles is less than one-hundred percent. In other words, there is some amount of time within each operating period P1-P4 during which there is little or no appreciable loading of the DC source 108. Under these conditions, and because there is no overlapping of any of the PWM pulses 206 (or 306/306') and 208 (or 308/308'), there is also no "double-loading" of the DC source 108.

With respect to FIGS. 2 and 3a/3b, although only two sequences of signal pulses are described for the sake of simplicity and clarity, it is to be appreciated that a greater number of signal pulse sequences can be included in each operating period. Thus, for example, three or more sequences of pulses may be generated such that the sum of the respective duty cycles of these or more three pulses may be less than one-hundred percent. Any of the pulse width modulated electrical pulses may end contemporaneous with the start of another pulse width modulated electrical pulses, thus reducing transient signal generation.

Third Illustrative Operation

Figure 4:
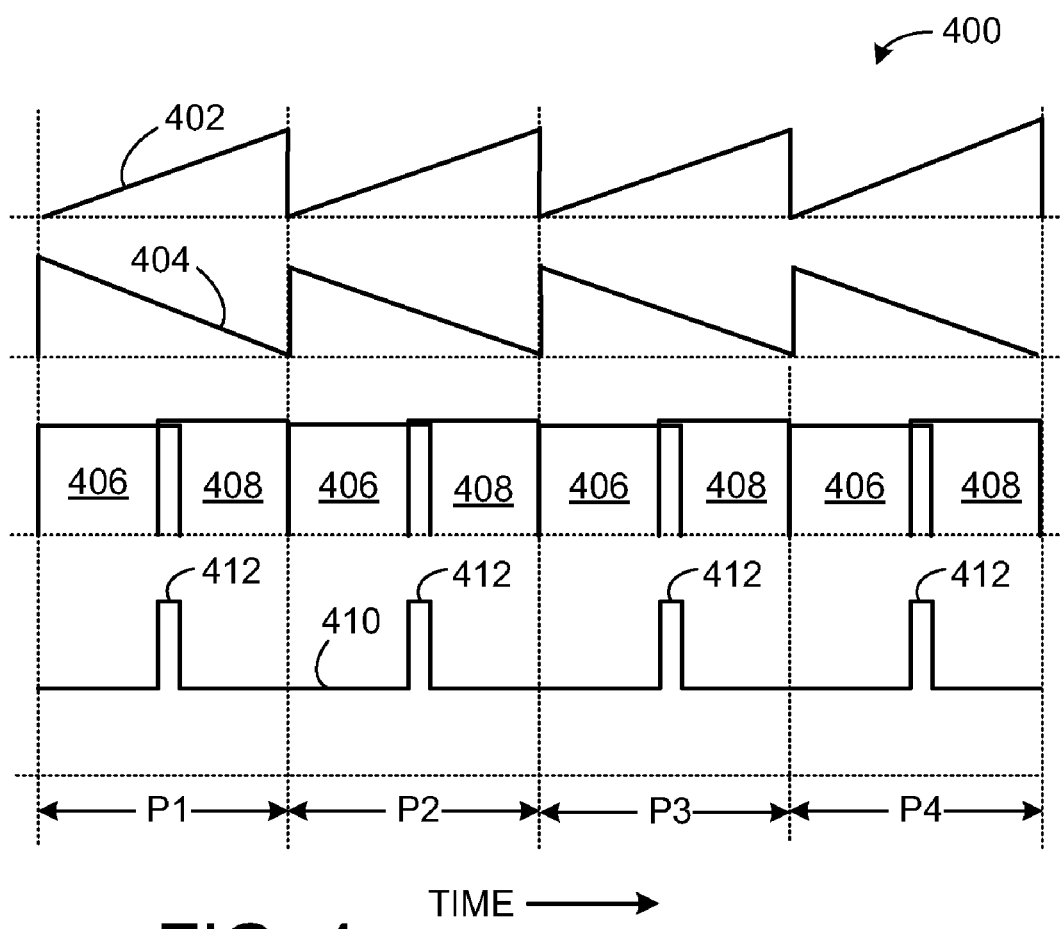
FIG. 4 is yet another signal timing diagram according to the present teachings.

FIG. 4 is a signal timing diagram 400 according to another illustrative and non-limiting operation according to the present teachings. The signal timing diagram 400 will be described with reference to circuit 100 in the interest of clarity. However, the present teachings contemplate other circuit and/or system implementations consistent with the teachings of FIG. 4.

The signal timing diagram 400 includes a first counter signal 402 and a second counter signal 404. The counter signals 402 and 404 correspond to up-counter and down-counter operations, respectively. In one implementation, the counter signal 402 corresponds to operations of the first voltage converter 104, while the counter signal 404 corresponds to the second voltage converter 106. However, other suitable implementations can also be used.

The signal timing diagram 400 includes a first sequence of PWM pulses 406, and a second sequence of PWM pulses 408. Each PWM pulse 406 corresponds to a switched pulse of electrical energy provided by the first voltage converter 104. Each PWM pulse 408 corresponds to a switched pulse of electrical energy provided by the second voltage converter 106. As depicted in FIG. 4, each of the PWM pulses 406 is defined by a duty cycle in excess of fifty percent. In turn, each of the PWM pulses 408 is defined by a respective duty cycle that is greater fifty percent. Accordingly, the sum of the respective duty cycles of the PWM pulses 406 and 408 is greater than one-hundred percent.

Each PWM pulse 406 starts, or switches "ON", at the beginning of a respective period P1 through P4. Conversely, each PWM pulse 408 ends, or switches "OFF", at the end of a respective operating period P1-P4. Any particular PWM pulse 408 ends simultaneously with the start of another PWM pulse 406, such that a stream of PWM pulses 406 and 408 are generated. The power switching load as seen by the DC source 108 is represented by the loading waveform 410.

As shown, the DC source 108 experiences an unavoidable double-loading period 412 during each operating period P1 through P4. It is further noted that, despite the double-loading periods 412, the DC source 108 is subject to a minimum of ON/OFF load switching, thus reducing harmonic signal generation and improving battery life-cycling as compared to known techniques. While only four operating periods P1-P4 are depicted, any number of sequential operating periods can be used.

Although only two sequences of signal pulses are described for the sake of simplicity and clarity, it is to be appreciated that a greater number of signal pulse sequences can be included in each operating period. Thus, for example, three or more pulses may be generated such that the sum of the respective duty cycles of these or more three pulses may be greater than one-hundred percent. Any of the pulse width modulated electrical pulses may end contemporaneous with the start of another pulse width modulated electrical pulses, thus reducing transient signal generation.

Illustrative Method

Figure 5:
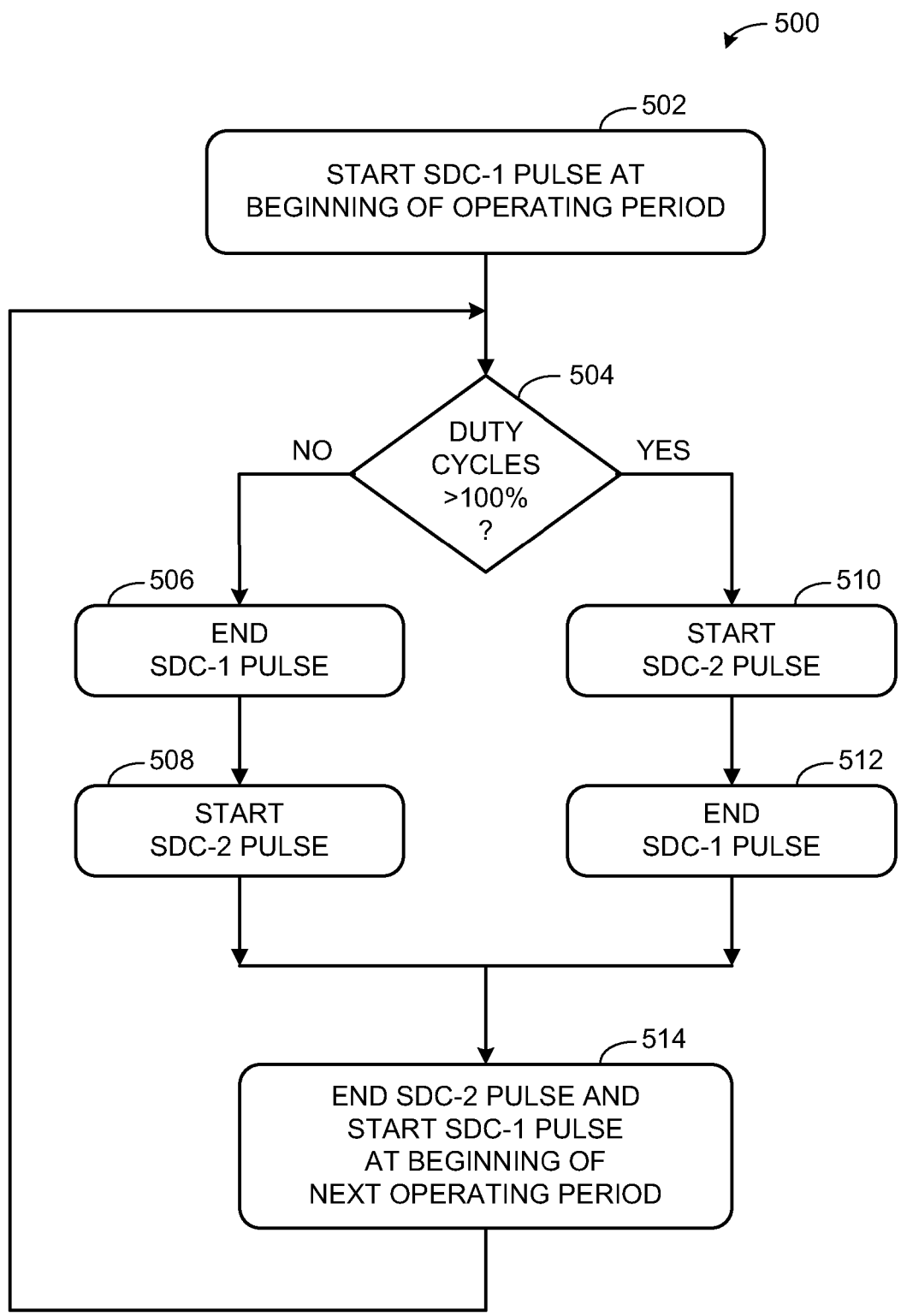
FIG. 5 is a flow diagram depicting operational steps in accordance with the present teachings.

FIG. 5 is a flow diagram depicting a method 500 according to the present teachings. The method 500 corresponds to an illustrative and non-limiting operating scenario during which an electronic device (e.g., a cellular telephone, etc.) requires generation of two DC voltages. The method 500 includes particular steps and order of execution. However, it is to be understood that other methods respectively including other steps, and/or omitting one or more of the depicted steps, and/or proceeding in other orders of execution may also be used in accordance with the present teachings. Therefore, the method 500 is illustrative and non-limiting with respect to the operations contemplated by the present teachings.

At 502, a first PWM pulse (e.g., 206) is started (switch "ON") at the beginning of a predetermined timing period. As shown, the first pulse is provided a step-down voltage converter designated as SDC-1. The SDC-1 pulse is assumed to be generated by one of two or more voltage converters operating within a common system and controlled or otherwise synchronized to a repetitive sequence of operating periods. As a result, the at least two voltage converters (e.g., 104 and 106) are operating with respectively variable duty cycles.

At 504, it is determined if the sum of the instantaneous duty cycles of the two voltage converters is lesser or greater than one-hundred percent. If the sum is less than or equal to one-hundred percent, then the method 500 proceeds to 506 below. If the sum exceeds one-hundred percent, then the method 500 proceeds to 510 below.

At 506, the SDC-1 pulse (e.g., 206) ended (switched "OFF") after being energized for a time corresponding to the respective instantaneous duty cycle.

At 508, a second PWM pulse (e.g., 208) is started (switched "ON"). The second PWM pulse is provided by the other of the two step-down voltage converters, designated as SDC-2. In this way, the SDC-1 and SDC-2 PWM pulses are provided by respective voltage converters. The SDC-2 pulse is energized some time after or contemporaneous with the end of the most recent SDC-1 pulse. Thus, some period of time (or none at all) transpires between end of the most recent SDC-1 pulse (e.g., 206) and the start of the next SDC-2 pulse (e.g., 208). This process may be repeated depending on the number of SDC pulses that are present. The method 500 then proceeds to 514 below.

At 510, an SDC-2 pulse is started (switched "ON"). It is noted that when only two pulses are present, the SDC-2 pulse at least partially overlaps the present SDC-1 pulse in time. If more than two SDC pulses are present, at least one SDC pulse partially overlaps another SDC pulse. As such, the corresponding DC source (e.g., 108) is double-loaded for at least some period of time (e.g., 412).

At 512, the present SDC-1 pulse is ended (switched "OFF"), after being energized for a time corresponding to the respective instantaneous duty cycle. It is noted that the SDC-2 pulse, which began at 510 above, remains energized. The method then proceeds to 514 below.

At 514, the present SDC-2 pulse is ended previous to or simultaneous with the start of the next SDC-1 pulse at the beginning of the next operating period. Thus, the previous operating period (e.g., P1) is over, and the next sequential operating period (e.g., P2) has begun. The method 500 then returns to 504 above so as to maintain cyclic operations until the present need for voltage conversion has ended (e.g., user terminates operation of a cellular telephone, etc.).

The method 500 corresponds to a need for at least two distinct operating voltages derive from a single DC source. As generally described above, more than two operating voltages may be simultaneously derived from a single DC source. Thus, the present teachings contemplate synchronized operation of a plurality of voltage converters so as to provide for the electrical needs of a circuit or device (i.e., load).

Illustrative Apparatus

Figure 6:
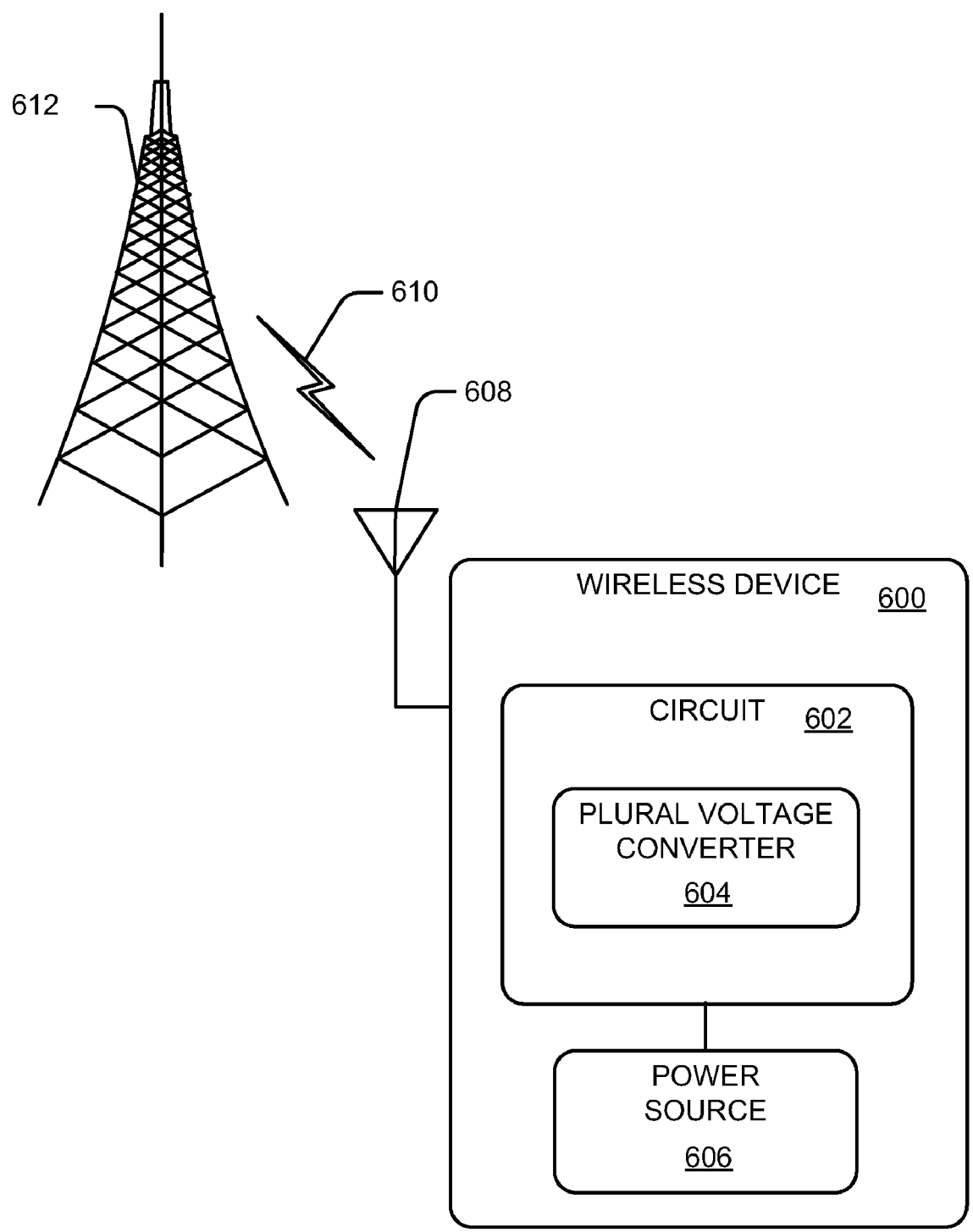
FIG. 6 is a block diagram depicting an apparatus in accordance with the present teachings.

FIG. 6 is a block diagrammatic view depicting a wireless device (i.e., apparatus) 600 including aspects of the present teachings. For purposes of non-limiting example, the wireless device 600 is presumed to include various resources that are not specifically depicted in the interest of clarity. The wireless device 600 is further presumed to be configured to perform in one or more wireless operating modes (e.g., cellular communications, global positioning system (GPS) reception, etc.).

The wireless device 600 includes a circuit 602. The circuit 602 includes, among other possible features, plural voltage converter 604. The plural voltage converter 604 is configured to perform in accordance with the present teachings. Thus, the plural voltage converter 604 can be implemented by way of the circuit 100. Other implementations in accordance with the present teachings can also be used. In any case, the plural voltage converter 604 provides two (or more) regulated DC operating voltages derived from a single power source.

The wireless device 600 further includes a source of electrical energy or "power source" 606. In one or more implementations, the power source 606 is defined by one or more batteries. Other types of power source 606 may also be used. In any case, the power source 606 is coupled so as to provide electrical energy to the circuit 602, by way of the plural voltage converter 604. In this way, the wireless device 600 is presumed to be operable in a portable manner.

The wireless device 600 further includes an antenna 608. The wireless device 600 is presumed to operate by way of wireless signals 610 between the antenna 608 and a wireless network 612. A single cellular tower 612 is depicted in the interest of simplicity. However, it is to be understood that other resources (not shown) of a corresponding wireless network are also present and operative as needed so as to enable the wireless device 600 to perform its various functions (cellular communications, Internet access, etc.). The wireless device 600 is a general and non-limiting example of countless devices and systems that may be configured and operating in accordance with the means and techniques of the present teachings.

Conclusion

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims.

The invention claimed is:

1. An electronic circuit, comprising:
a first voltage converter to provide a first output signal starting at a beginning of an operating period;
a second voltage converter to provide a second output signal ending at the beginning of the operating period; and
a timing component configured to determine the operating period based on a plurality of synchronized counter signals.

2. The electronic circuit according to claim 1, wherein the first voltage converter and the second voltage converter are respectively coupled to receive electrical energy from the same direct-current (DC) source.

3. The electronic circuit according to claim 2, wherein the DC source includes at least one battery.

4. The electronic circuit according to claim 1, wherein at least the first output signal or the second output signal is pulse width modulated in accordance with a DC voltage requirement of a respective load.

5. The electronic circuit according to claim 1 further comprising a filter configured to filter either the first output signal or the second output signal so as to derive a DC voltage.

6. The electronic circuit according to claim 5 wherein the filter is a first filter and further comprising a second filter configured to filter the other of the first output signal or the second output signal so as to derive another DC voltage.

7. The electronic circuit according to claim 1, wherein:
the first voltage converter is defined by a step down converter configured to provide a first DC voltage requirement of a load; and
the second voltage converter is defined by a step down converter configured to provide a second DC voltage requirement of another load.

8. The electronic circuit according to claim 7, wherein the first DC voltage is different than the second DC voltage.

9. The electronic circuit according to claim 1, wherein the start of the first output signal is contemporaneous with the end of the second output signal at the beginning of each operating period, and wherein the first output signal and the second output signal are defined by respective duty cycles.

10. A method, comprising:
generating a first electrical signal pulse synchronized to start at a beginning of an operating period;
generating a second electrical signal pulse synchronized to end at the beginning of the operating period;
filtering at least the first electrical signal pulse or the second electrical signal pulse so as to derive at least one direct-current (DC) voltage; and
determining the operating period based on a plurality of synchronized counter signals.

11. The method according to claim 10 further comprising coupling the at least one DC voltage to a load.

12. The method according to claim 10 further comprising accessing electrical energy from a source during the generating the first electrical signal pulse and the generating the second electrical signal pulse.

13. The method according to claim 10, wherein the first electrical signal pulse starts approximately contemporaneously with the end of the second electrical signal pulse.

14. An electronic circuit configured to:
receive electrical energy from a direct current (DC) source;
output a stream of signal pulses using the electrical energy, each signal pulse synchronized so as to either start or end at a beginning of each of a sequence of operating periods; and
determine the sequence of operating periods based on a plurality of synchronized counter signals.

15. The voltage converter according to claim 14 further configured such that each signal pulse is width modulated according to a voltage requirement of a load.

16. The voltage converter according to claim 14, wherein the electronic circuit is defined by a step down DC-DC voltage converter.

17. An apparatus, comprising:
a source of electrical energy
an electronic circuit coupled to the source of electrical energy, the electronic circuit including:
a controller configured to control at least two voltage converters according to a sequence of operating periods;
a first voltage converter configured to receive electrical energy from the source and to output a first stream of electrical pulses, each electrical pulse in the first stream of electrical pulses starting at a beginning of a respective one of the operating periods;
a second voltage converter configured to receive electrical energy from the source and output a second stream of electrical pulses, each electrical pulse in the second stream of electrical pulses ending at the beginning of a respective one of the operating periods; and
a timing component configured to determine the sequence of operating periods based on a plurality of synchronized counter signals.

18. The apparatus according to claim 17, wherein at least the first voltage converter or the second voltage converter is configured to pulse width modulate the corresponding stream of electrical pulses in accordance with a voltage requirement of the apparatus.

19. The apparatus according to claim 17, wherein the apparatus is configured to perform one or more wireless functions.

20. A circuit, comprising:
a first circuit portion configured to output a stream of first pulse width modulated electrical pulses and the first circuit portion is configured to operate according to a first DC voltage requirement of a load;
a second circuit portion configured to output a stream of second pulse width modulated electrical pulses and the second circuit portion is configured to operate according to a second DC voltage requirement of another load, each of the second pulse width modulated electrical pulses ending contemporaneous with a start of one of the first pulse width modulated electrical pulses; and
a timing component configured to determine an operating period for the first and second pulse width modulated electrical pulses, the operating period based on a plurality of synchronized counter signals.

21. The circuit according to claim 20 further comprising a controller configured to control operation of the first circuit portion and the second circuit portion according to a repetitive sequence of operating periods.

22. A method, comprising:
generating a first electrical signal pulse synchronized to start at a beginning of an operating period;
generating a second electrical signal pulse synchronized to start as the first electrical signal pulse is ending; and
determining the operating period based on a plurality of synchronized counter signals, at least one of the plurality of synchronized counter signals incrementally counts from zero to a predetermined count, and at least another of the plurality of synchronized counter signals decrementally counts from another predetermined count to zero.

* * * * *